United States Patent [19]
DeNijs et al.

[11] Patent Number: 5,690,567
[45] Date of Patent: Nov. 25, 1997

[54] TRANSMISSION FOR CONVERTING ROTARY MOTION INTO LINEAR MOTION

[75] Inventors: Jan F.C. DeNijs, Wakefield, Mass.; Matthias Lindner, Bad Nauheim, Germany

[73] Assignee: Brown & Sharpe Manufacturing Company, North Kingstown, R.I.

[21] Appl. No.: 778,698

[22] Filed: Jan. 3, 1997

Related U.S. Application Data

[62] Division of Ser. No. 552,552, Nov. 3, 1995.
[51] Int. Cl.⁶ .............................. F16H 9/00; F16H 27/02; F16H 29/02
[52] U.S. Cl. .............................. 474/73; 474/69; 474/84; 74/89.21; 74/89.22; 74/89.2; 198/750.1
[58] Field of Search .............................. 198/750.1; 74/89.21, 74/89.22; 474/69, 73, 84, 85

[56] References Cited

U.S. PATENT DOCUMENTS

| | | | |
|---|---|---|---|
| 5,198,736 | 3/1993 | Azuma et al. | 318/568.1 |
| 5,207,115 | 5/1993 | Takei | 74/479 |
| 5,267,478 | 12/1993 | Stridsberg | 74/89.17 |
| 5,517,872 | 5/1996 | Anada | 74/89.21 |
| 5,528,948 | 6/1996 | De Gelis | 74/89.22 |
| 5,539,987 | 7/1996 | Zennyoji | 33/1 M |
| 5,564,309 | 10/1996 | Nakamura et al. | 74/89.21 |
| 5,611,248 | 3/1997 | Peltier | 74/490.09 |

FOREIGN PATENT DOCUMENTS 2 274 719  8/1994  United Kingdom .................. 74/89.22

*Primary Examiner*—Tamara L. Graysay
*Assistant Examiner*—Gary S. Hartmann
*Attorney, Agent, or Firm*—Wolf, Greenfield & Sacks, P.C.

[57] ABSTRACT

A transmission for reducing the pulley ratio between a drive shaft and a transmission shaft. The transmission is adapted to convert a higher speed rotary motion to a lower speed linear motion. The transmission has two pulleys rigidly mounted together on a shaft and the pulleys have a different number of teeth. A pair of belts are mounted on the drive shaft and a follower shaft, each one of the belts engages one of the transmission pulleys. One belt on the transmission shaft engages a pulley on the top of a first transmission pulley and another on the bottom of a second transmission pulley. When the drive shaft imparts motion to the belts, the belts move the transmission between the drive shaft and the follower shaft. By arresting the movement of one of the belts by a clutch/brake, the transmission can be converted into a two speed transmission. If the belts are independently driven, one each by two motors, the transmission becomes operable in an infinite number of pulley ratios. One particular application for this pulley transmission is in a carriage drive system for a Coordinate Measuring Machine.

6 Claims, 5 Drawing Sheets

TRANSMISSION FOR CONVERTING ROTARY MOTION INTO LINEAR MOTION

RELATED APPLICATIONS

This application is a division of application Ser. No. 08/552,552, filed Nov. 3, 1995, entitled "Transmission for Converting Rotary Motion Into Linear Motion" and now pending.

BACKGROUND OF THE INVENTION

1. Field of the Invention.

The present invention relates to a transmission that converts rotary motion into linear motion. The transmission may be used for controlling the position of a carriage in a coordinate measuring machine, but is not limited to such use.

2. Background of the Invention.

The prior art contains several mechanisms which convert rotary motion into linear motion. An example of one such device is a lead screw mechanism that operates by rotating a threaded shaft within a threaded bushing that is mounted on a carriage. When the shaft rotates, the carriage moves with the threaded bushing along the shaft.

Another example of a mechanism which converts rotary motion into linear motion is a rack and pinion drive. A rack is a substantially straight bar which has teeth disposed on one surface. A small gear, or pinion, rides along the rack when the pinion is turned. A carriage can be attached to either the rack or the pinion and moved in a linear motion as the pinion turns. Typically, the pinion is attached to the carriage.

Transmissions which convert rotary motion into linear motion are useful in many environments. One such application is for controlling the position of a carriage of a Coordinate Measuring Machine (CMM). The carriage of a CMM moves along a linear path and moves a probe to a desired measurement location. Typically, a CMM uses one or more rack and pinion mechanisms to move the carriage along the linear path while the pinion is turned, typically by a motor.

One problem with rack and pinion drive mechanisms is that they generally operate with low gear ratios. That is, the rotary motion which is introduced into the system by the pinion is translated into linear motion of about the same speed as the tangential velocity of the gear. Very often, it is desirable to run a carriage or platform at a slow speed to provide for precise control of the carriage position. However, the low speed which is often desirable for the carriage is not an ideal working condition for DC rotary motors which are often used to move the carriage. Such a motor is inefficient at low speeds, and creates low frequency drive vibrations that excite the mechanical structure. Typically these low frequency vibrations can be felt on the device as the carriage moves. Very often, it is necessary to add an extra gear stage or trains into the drive system to boost the gear ratio so that the motor can run at a higher, more optimal RPM, while the linear motion of the carriage remains at a slower, more desirable speed. The addition of gear stages contributes to the cost and complexity of the transmission. It is desirable, therefore, to provide a simple, low cost transmission having a high ratio of input rotary speed to output linear speed.

SUMMARY OF THE INVENTION

In accordance with the present invention, a transmission for converting the rotary motion of a rotary drive mechanism to the linear motion of a carriage is provided. The transmission includes a belt assembly which is connected to the rotary drive mechanism. A first pulley is driven by the belt assembly at a first belt velocity and is coupled to the carriage for rotation at a first angular velocity. A second pulley is driven by the belt assembly at a second belt velocity and is coupled to the carriage for rotation at a second angular velocity. The first and second pulleys are mechanically coupled to establish a predetermined ratio of the first angular velocity to the second angular velocity. The carriage moves linearly with respect to the belt assembly at a carriage velocity determined by the first and second belt velocities, the first and second pulley sizes and the predetermined ratio of the first and second angular velocities.

Various aspects of the invention include providing first and second pulleys of different sizes and a predetermined ratio of the first and second angular velocities equal to one. The mechanical coupling may include a transmission shaft rotatably mounted to the carriage, and the first and second pulleys may be rigidly affixed to the transmission shaft. The belt assembly may include a drive shaft coupled to the rotary drive mechanism, a follower shaft spaced from the drive shaft, and first and second belts mounted for rotation around the drive shaft and the follower shaft, the first and second belts engaging the first and second pulleys, respectively. The transmission may include a clutch mechanism for disengaging the second belt from the drive shaft.

In another aspect of the invention, the belt assembly may include first and second drive shafts for coupling to first and second drive motors, respectively, a follower shaft spaced from the first and second drive shafts, a first belt mounted for rotation around the first shaft and the follower shaft and a second belt mounted for rotation around the second drive shaft and follower shaft. The first and second pulleys may have equal sizes, and the carriage speed is established by the first belt velocity and the second belt velocity.

In still another aspect of the invention, equally sized first and second pulleys are provided, the first and second belt velocities are equal and the predetermined ratio of the angular velocities is not equal to one. In this aspect of the invention, the belt assembly may comprise a drive shaft for coupling the transmission to the rotary drive mechanism, a follower shaft spaced from the drive shaft and a single belt mounted for rotation around the drive shaft and the follower shaft. Further, in this aspect of the invention, the mechanical coupling may comprise a third pulley mounted for rotation with the first pulley, and a fourth pulley mounted for rotation with the second pulley. The third and fourth pulleys, which may have different sizes, are connected by a coupling belt. The predetermined ratio of the first and second angular velocities is determined by the relative sizes of the third and fourth pulleys, and the carriage velocity is established by the predetermined ratio.

BRIEF DESCRIPTION OF THE DRAWINGS

Preferred embodiments of the present invention will be described with reference to the accompanying drawings, in which.

DETAILED DESCRIPTION OF THE INVENTION

Figure 1:
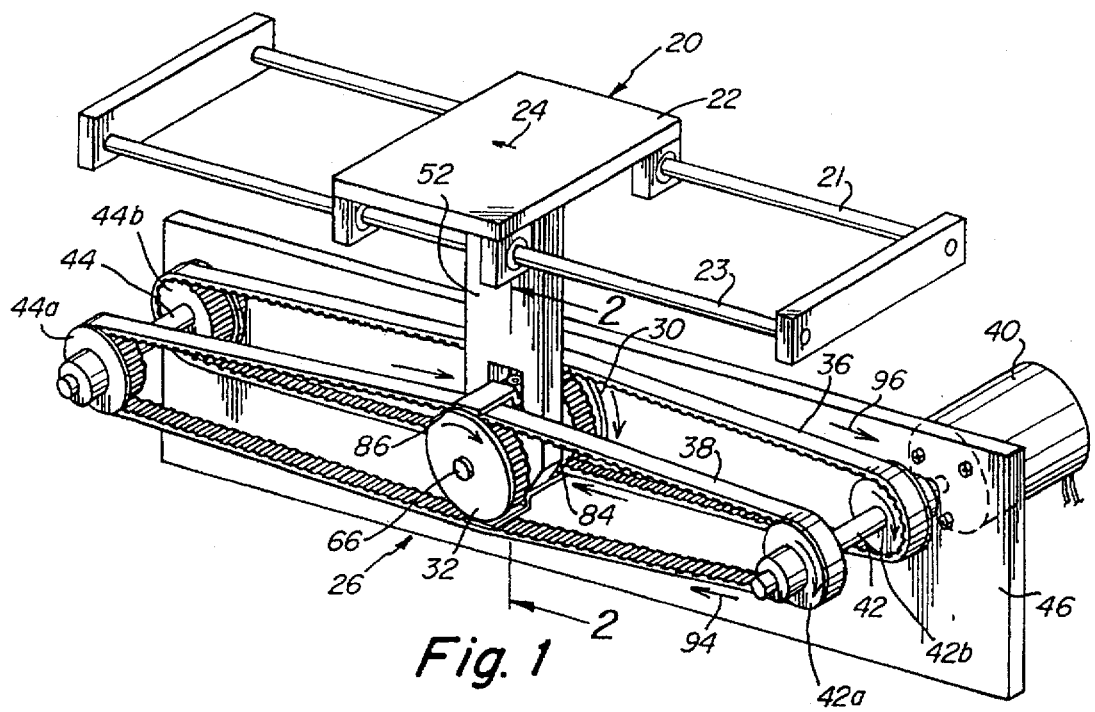
FIG. 1 is a perspective view of a first embodiment of the transmission of the present invention.
Figure 2:
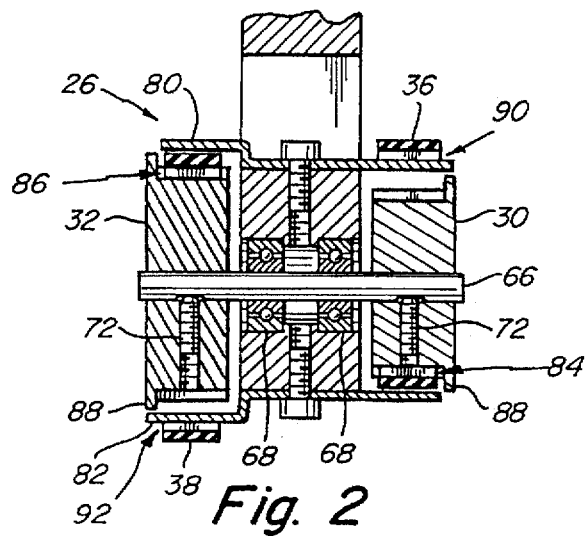
FIG. 2 is a cross-sectional view of the transmission taken along section line 2—2 of FIG. 1.

Referring now to the drawings, in which like reference numerals indicate like elements, FIG. 1 is a perspective view of a first embodiment of a transmission according to the present invention. More specifically, FIG. 1 shows a carriage 20, having a platform 22 which is linearly movable along a direction of movement 24. In the example of FIG. 1, platform 22 moves along guide rods 21 and 23. The platform is connected to a transmission 26 which converts rotary motion into linear motion to move the carriage along direction of movement 24.

The transmission 26 includes a smaller timing pulley 30 and a larger timing pulley 32. The pulleys 30, 32 are rotated by first and second belts 36 and 38, respectively. The first belt 36 engages the bottom of the pulley 30, and the second belt 38 engages the top of the pulley 32. The pulleys 30 and 32 are rigidly mounted to a rotatable shaft 66 and have different numbers of teeth and different radii. The platform 22 is connected to the transmission by an elongate bar 52. The transmission shaft 66, also referred to as a driven shaft, is rotatably received within the lower end of the elongate bar. The transmission shaft 66 is secured for low friction rotation with respect to the bar by bearings 68. The pulleys 30 and 32 are rigidly mounted on the transmission shaft by set screws 72.

When the belts 36, 38 are rotated, as by an electric motor 40, the platform 22 moves along the direction of movement 24. In a transmission according to this invention, a relatively high speed electric rotary motor 40 may be used to move the carriage platform 22 at a slower linear speed. Various aspects of a transmission according to this embodiment are disclosed below with reference to FIGS. 1–6.

The pulleys 30 and 32 are mounted between the belts 36 and 38, respectively, and between a drive shaft 42 and a follower shaft 44, each of which are rotatably mounted on a housing 46. As used herein, the term pulley is intended to include, but is not limited to, any wheel which rotates on a shaft, with or without teeth, that is adapted to transmit motion and/or energy. The transmission shaft 66, the drive shaft 42 and the follower shaft 44 are parallel. Although two individual pulleys 42a, 42b are shown on the drive shaft and two individual pulleys 44a, 44b are shown on the follower shaft, one skilled in the art will recognize that other drive configurations would perform suitably, such as a shaft adapted to carry the belt. Alternatively, a single pulley extending the axial length of the shaft may be used. Further, one skilled in the art will recognize that various friction reducing means, such as bearings (not shown), may be used to reduce friction between the rotating shafts 42, 44 and the housing 46.

The first and second belts, 36 and 38, respectively, may be made of any suitable material. Currently, synthetic neoprene rubber with fiberglass cords is the preferred material. Suitable belts are commercially available under the product description Dayco Syncro-Cog RPP-Plus. In the presently preferred embodiment, the belts have "teeth" on their inwardly facing surfaces. The teeth are dimensioned to engage the various timing pulleys of the system. The teeth on the belts ensure non-slipping contact between the belts and the pulleys and transmission pulleys. One skilled in the art will recognize that a single belt may be used to provide motion to the transmission pulleys. Other configurations which produce non slipping contact between the belts and the pulleys will also be recognized by those skilled in the art. For example, idlers and pulleys may be used to direct each belt toward the respective pulley. In the preferred embodiment, the belts are driven by the motor 40, which may be any suitable commercially available motor. The motor 40 may be any motor suitable for CMM applications of the transmission. A Glentek 2450M motor is presently preferred. Additionally, and preferably, the motor may be reversible to enable the carriage to move in either direction along guide rods 21 and 23.

Figure 3:
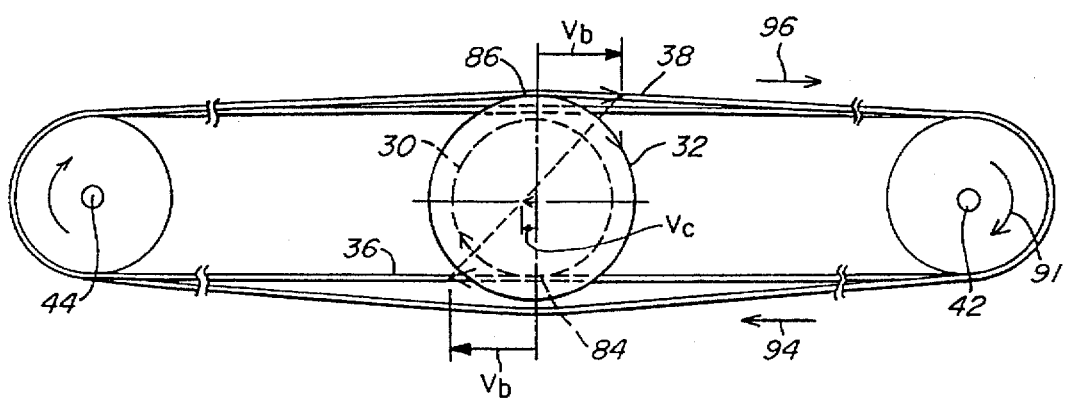
FIG. 3 is a schematic diagram of the transmission of FIG. 1, including a velocity diagram.

Each belt 36, 38 contacts the respective pulley 30, 32 at one contact location. For ease of discussion, the direction the belt as it comes off the drive shaft is designated as a drive direction 94, and the direction of the belt as it moves toward the drive shaft is designated as a the return direction 96. As shown in FIGS. 1 and 3, the motor 40 is turning in the clockwise direction. The first transmission pulley 30 contacts the belt 36 at a bottom location 84 as the belt moves in the drive direction 94 (shown clearly in FIGS. 2. and 3). The second transmission pulley 32 contacts the second belt 38 at a top location 86 as it moves in the return direction 96. Guide pieces 80 and 82, mounted on the elongate bar 52 and disposed at the top and bottom of the pulleys, respectively, direct the belts into contact at the desired contact locations on the spur pulleys. Additionally, the guide pieces 80 and 82 separate the belts from the pulleys at the locations where contact is not desired. In particular, guide piece 80 maintains contact between belt 38 and pulley 32 at location 86 and prevents contact between belt 36 and pulley 30 at location 90. Similarly, guide piece 82 maintains contact between belt 36 and pulley 30 at location 84 and prevents contact between belt 38 and pulley 32 at location 92. Each pulley may be provided with a shoulder 88 which maintains the alignment between each pulley and the belt that drives it.

The operation of the transmission according to this embodiment is discussed with reference to FIG. 3, which shows a schematic view of the transmission and the relative velocities of the belts. As indicated by arrow 91, the pulleys on the drive shaft 42 are shown rotating in a clockwise direction. Thus the driving direction 94 is along the bottom of the diagram, and the return direction 96 is along the top. In this embodiment, the belts 36 and 38 are maintained at a constant belt velocity $V_b$. The larger pulley 32 has N teeth, where N is an integer greater than 1. The second belt 38 contacts pulley 32 at location 86. A velocity vector $V_b$ at the location 86 represents the velocity of the pulley 32 at the point of contact. The smaller pulley 30 has N-x teeth, where x is an integer greater than 1 but less than N-1, and contacts the first belt 36 at location 84. Since the pulley 30 contacts the first belt 36 along the driving direction, the velocity $V_b$ imparted to the first pulley 30 by the first belt 36 is represented by a vector in the opposite direction from the vector associated with pulley 32. Since the pulleys are both rigidly mounted on the transmission shaft 66, each rotate in the same speed. Thus, the opposite velocity vectors each act on the center of the transmission bar 52 and the resultant carriage velocity vector, represented by $V_c$, indicates the linear velocity imparted to the transmission bar 52 and carriage 22 by the belts 36 and 38. As readily seen from the vectors, the transmission converts a relatively large belt velocity $V_b$, into a small carriage velocity $V_c$. Accordingly, a relatively high RPM motor can be used to move the carriage at a relatively slow speed.

Figure 4:
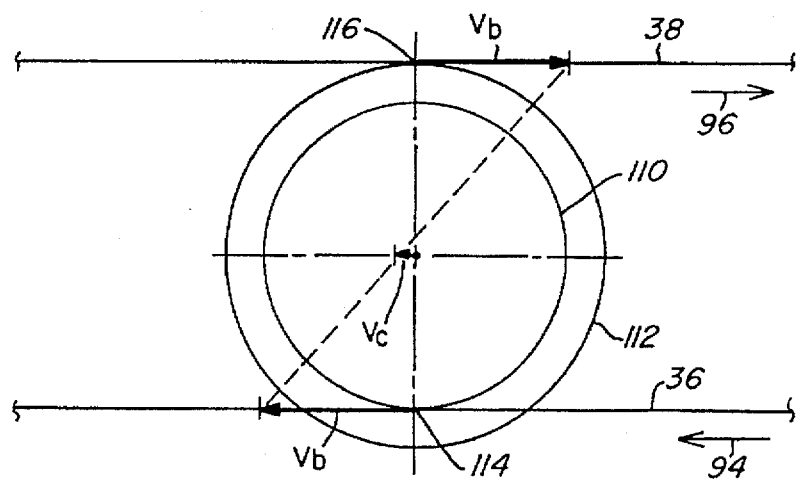
FIGS. 4, 5 and 6 are schematic velocity diagrams of the speed of the carriage with various transmission configurations.
Figure 5:
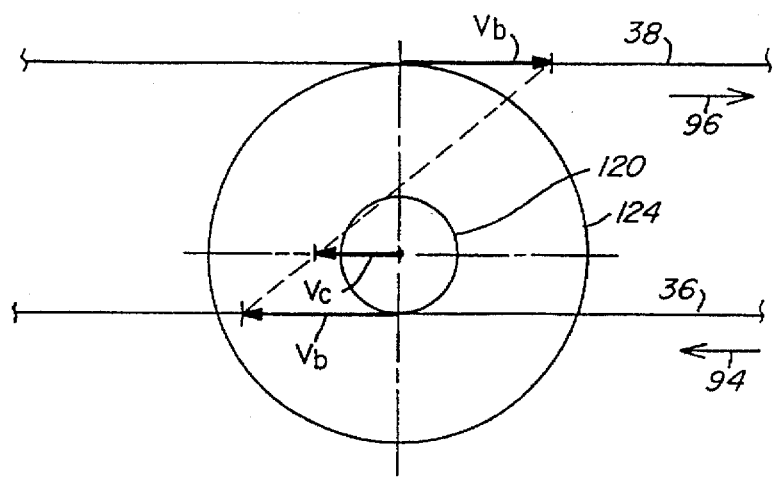
Figure 6:
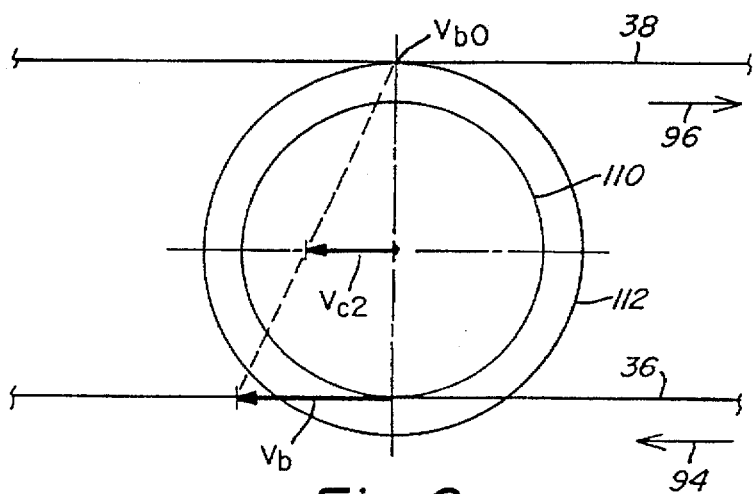

FIGS. 4, 5, and 6, illustrate several aspects of the first embodiment. As shown in FIGS. 4 and 5, the relative sizes of the transmission pulleys may be varied to effect different transmission ratios. The belts 36 and 38 are represented by lines, and the transmission pulleys are represented by circles of different diameters. Only the portions of the belts which contact pulleys are shown. With specific reference to FIG. 4, the belt 36 engages a smaller pulley 110 at bottom location 114. A larger transmission pulley 112 engages the belt 38 at a top location 116. As described with reference to FIGS. 1–2, the transmission pulleys 110 and 112 are each rigidly mounted on a common shaft, so there is no relative motion between the pulleys. Relative motion or slippage between the pulleys is undesirable because it causes the transmission ratio to become unpredictable. The first transmission pulley 110 engages the first belt 36 in the drive direction 94, and the belt imparts a velocity $V_b$ to the pulley 110 at location 114. The second transmission pulley 112 engages belt 38 moving in the return direction 96. The belt 38 imparts a velocity $V_b$ to the second transmission pulley 112 in the return direction, which is opposite to the velocity $V_b$ in the drive direction 94. Because transmission pulley 110 has a smaller number of teeth than the transmission pulley 112, and the transmission pulleys are rigidly mounted to one another, the resultant carriage velocity $V_c$ depends on the relative sizes of pulleys 110 and 112.

FIG. 5 illustrates transmission pulleys which are configured for a higher carriage velocity than the transmission pulleys shown in FIG. 4. The transmission includes a first smaller transmission pulley 120 and a comparatively larger second transmission pulley 124. The smaller transmission pulley 120 has a smaller radius and fewer teeth than pulley 124. As readily seen by comparing FIGS. 4 and 5, the size difference between the pulleys is larger in FIG. 5 than in FIG. 4. Because the ratio of the pulley sizes is greater in FIG. 5 than in FIG. 4, the carriage velocity $V_c$ is greater in the example of FIG. 5.

By adjusting the relative sizes of the transmission pulleys and the number of pulley teeth (assuming constant teeth size), the transmission can be used to provide any pulley ratio desires. Since the pulleys are rigidly mounted to one another and must have the same rotational speed, the motion of the transmission can be expressed as follows:

$$\frac{V_b + V_c}{N} = \frac{V_b - V_c}{N - x} \quad (1)$$

where $V_b$ is the velocity of the belt, $V_c$ is the velocity of the carriage,

N is the number of teeth on the larger of the two transmission pulleys and is an integer greater than 1, and, N-x is the number of teeth on the smaller of the two transmission pulleys, where x is an integer greater than 1 and less than N-1.

This relation can be rewritten as shown in Equation (2) to solve for the carriage velocity.

$$V_c = \left(\frac{x}{2N - x}\right) V_b \quad (2)$$

The pulley ratio, i, for the above relation is defined as:

$$i = \frac{2N - x}{x} \quad (3)$$

Thus the carriage velocity as a function of the belt velocity can be represented as $V_c = V_b/i$. By choosing the number of teeth for the two pulleys, the pulley ratio i can be set. For example, if the number of pulley teeth on the larger pulley is 100 (N=100) and the difference between the number of teeth in the larger pulley and smaller pulley is 1, then the pulley ratio i=199 and the carriage velocity $V_c$ equals:

$$V_c = (\tfrac{1}{199}) V_b$$

That is, the carriage velocity is the belt velocity divided by 199. This shows the reduced speed which is possible with such a transmission system. Any pulley ratio can be designed to provide any ratio between the belt velocity $V_b$ and the carriage velocity $V_c$.

The invention may be implemented, in another configuration, with pulleys having different radii and no pulley teeth. Typically, the belts used in this embodiment have a smooth inner surface which moves along the pulley. Various known techniques may be used to ensure that each belt frictionally engages the respective pulley. If the spur timing pulleys (having teeth) are replaced with pulleys (without teeth) having different radii, equations (1), (2) and (3) can be rewritten as:

$$\frac{(V_b + V_c)}{R} = \frac{(V_b - V_c)}{r} \quad (1a)$$

Where R is the radius of the larger pulley, and
r is the radius of the smaller pulley.
Solving for the velocity of the carriage yields $$V_c = V_b \frac{(R - r)}{(R + r)} \quad (2a)$$

Thus the pulley ratio (transmission ratio) as a function of the radii of the transmission pulleys is:

$$i = \frac{(R + r)}{(R - r)} \quad (3a)$$

Accordingly, the transmission of the present invention can be implemented with pulleys having teeth or not having teeth rigidly mounted to the transmission shaft.

FIG. 6 illustrates a transmission configuration similar to FIG. 4, with the exception that FIG. 6 shows belt 38 as having a velocity ($V_{b0}$) of zero. As a result, the transmission is moved by belt 36 at velocity $V_b$. As readily seen by a comparison between FIGS. 4 and 6, carriage velocity $V_{c2}$ in FIG. 6 is greater than carriage velocity $V_c$ in FIG. 4. Accordingly, by eliminating the motion of one of the belts, such as belt 38, the carriage velocity can be increased significantly. Thus, the same pulley ratio can provide two different linear speeds in the transmission of the present invention. This is advantageous because it is sometimes desirable to move the carriage at a fast speed for large movements and at a slow speed for free movements.

Figure 7:
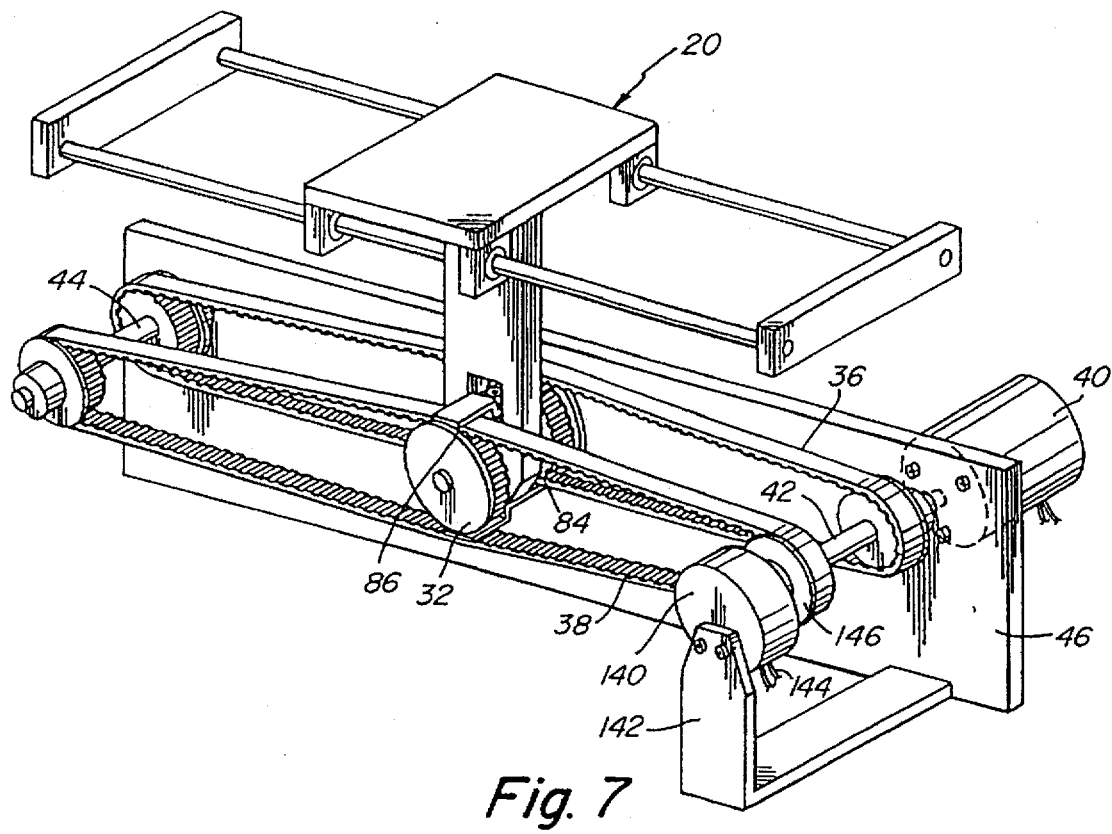
FIG. 7 is a perspective view of a second embodiment of the invention, which includes a clutch for disengaging one belt from the drive shaft.

The velocity of the belt 38 can be reduced to zero by using a clutch/brake mechanism 140, as shown in FIG. 7. The clutch/brake mechanism engages and disengages belt 38 with the drive shaft 42 to provide a two speed transmission. The clutch/brake is rigidly mounted on a mounting plate 142 which may extend from housing 46 and is electrically actuated by wires 144 connected to a controller (not shown). As shown, a drive pulley 146 on the drive shaft 42 is disengagable from the shaft. When the pulley 146 is disengaged, rotation of motor 40 is not coupled to the belt 38. Thus the belt velocity is zero. It will be understood that the belt 38 having zero velocity remains in contact with pulley 32 at location 86 and limits its rotation. The brake built into the clutch/brake mechanism ensures that the belt 38 does not move when the clutch is disengaged. The carriage may thus be driven at velocity $V_c$ (FIG. 4) when the clutch/brake mechanism 140 engages belt 38 with drive shaft 42 and at velocity $V_{c2}$ (FIG. 6) when clutch/brake mechanism 140 disengages belt 38 from drive shaft 42. The clutch/brake may be any suitable commercially available clutch/brake. One such clutch/brake is sold under the product name SOFSTEP PSCB-120.

When the clutch/brake is engaged, the transmission behaves exactly as the embodiment shown in FIGS. 1–5 and described above. The second drive belt 38 rotates at exactly the same speed as the first drive belt 36, because each is rigidly mounted on the same transmission shaft. When the clutch/brake is disengaged and belt 38 is not in motion, the velocity equations are rewritten as:

$$\frac{V_c}{N} = \frac{(V_b - V_c)}{N-x} \qquad (4)$$

which can be rewritten by solving for $V_c$ $$V_c = \frac{N}{2N-x} V_b \qquad (5)$$

Thus the pulley ratio becomes $$i_2 = \frac{2N-x}{N} \qquad (6)$$

Therefore, according to this embodiment, the pulley ratio to change from $$i = \frac{2N-x}{x} \qquad (7)$$

to $$i_2 = \frac{2N-x}{N} \qquad (8)$$

by the operation of the clutch mechanism. By representative example assume, as in the first embodiment, that N=100 and x=1. The high pulley ratio is in the example described above:

$$V_c = (1/199)V_b \qquad (9)$$

The low pulley ratio is:

$$V_c = (100/199)V_b \qquad (10)$$

Accordingly, a low pulley ratio (resulting in faster carriage movement) is obtained when the clutch is engaged, and a high pulley ratio (resulting in slower carriage movement) is obtained when the clutch is disengaged. This is particularly advantageous in a Coordinate Measuring Machine. The high pulley ratio can be used for low speed measuring moves, while the low pulley ratio is used for higher speed, longer distance clearance moves. Actuation of the clutch and brake may be performed by signals from a machine controller or computer (not shown).

Figure 8:
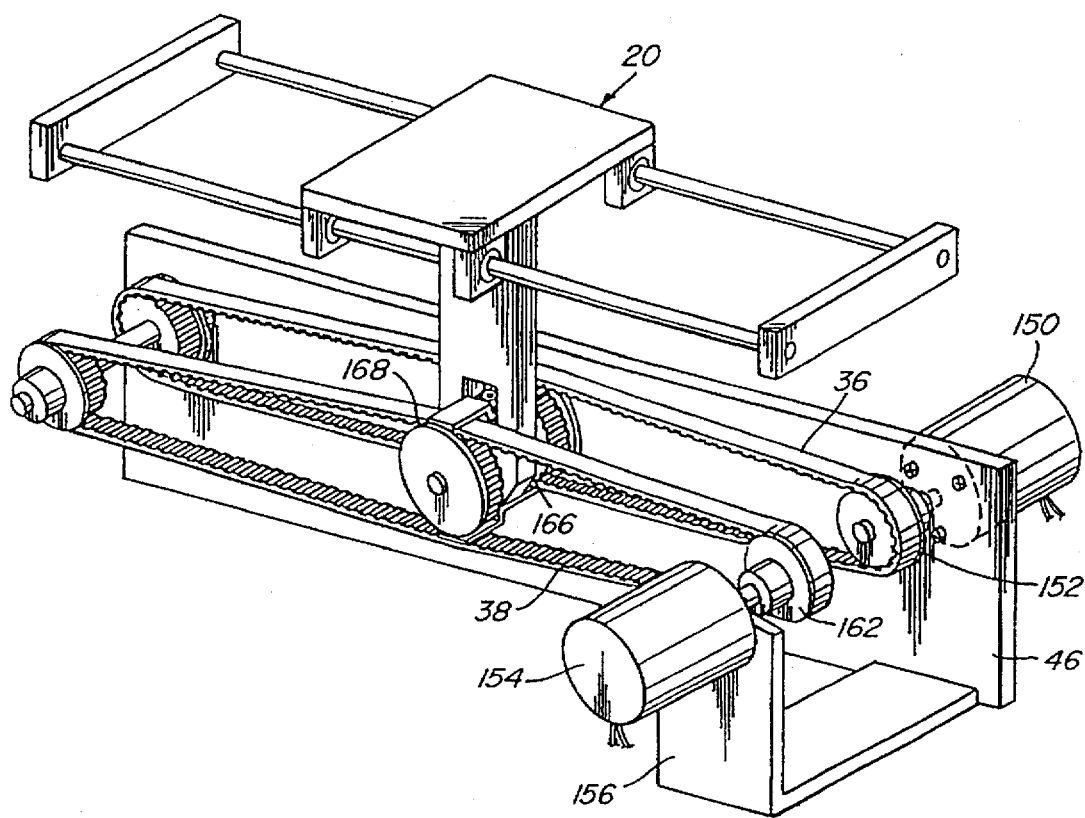
FIG. 8 is a perspective view of a third embodiment of the invention, wherein each belt of the dual belt transmission is separately driven to provide a continuously variable gear ratio.

In another embodiment of the invention, a continuously variable speed transmission is provided. In this embodiment, as shown in FIG. 8, the belts 36 and 38 are turned independently by two motors. A motor 150 turns a first drive pulley 152, which moves belt 36. In contrast to the previously described embodiment, the transmission pulleys of this embodiment preferably have the same number of teeth. A second motor 154 is rigidly mounted on a mounting plate 156 that is attached to the housing 46. The second motor 154 turns a second drive pulley 162, which moves belt 38. The drive pulley 162 has the same number of teeth and diameter as the drive pulley 152. Each motor 150, 154 is independently adjustable, and each operates at variable speeds. The motors driving the individual pulleys 152 and 162 are particularly advantageous, because they allow for continuous variation in carriage speed, depending on the difference in belt velocities.

The benefits of the continuously variable and controllable pulley ratio are demonstrated by the equations presented below. Because two motors are used, each belt 36 and 38 is independently and variably controlled. Let $V_{b1}$ be the linear velocity of belt 36 and $V_{b2}$ be the linear velocity of belt 38 at the point of contact with each transmission pulley, 166 and 168 respectively. Since the transmission pulleys have the same number of teeth, the following relation can be written:

$$V_{b1} + V_c = V_{b2} - V_c \qquad (11)$$

or, solving for the velocity of the carriage ($V_c$), $$V_c = \left( \frac{V_{b2} - V_{b1}}{2} \right) \qquad (12)$$

Thus, it is evident that the carriage velocity $V_c$ is dependent on the difference in belt velocities $V_{b1}$ and $V_{b2}$. The carriage velocity $V_c$ can be continuously changed by varying belt velocities $V_{b1}$ and $V_{b2}$. Accordingly, a continuously variable pulley ratio can be effected by changing one or both of the belt velocities.

Figure 9:
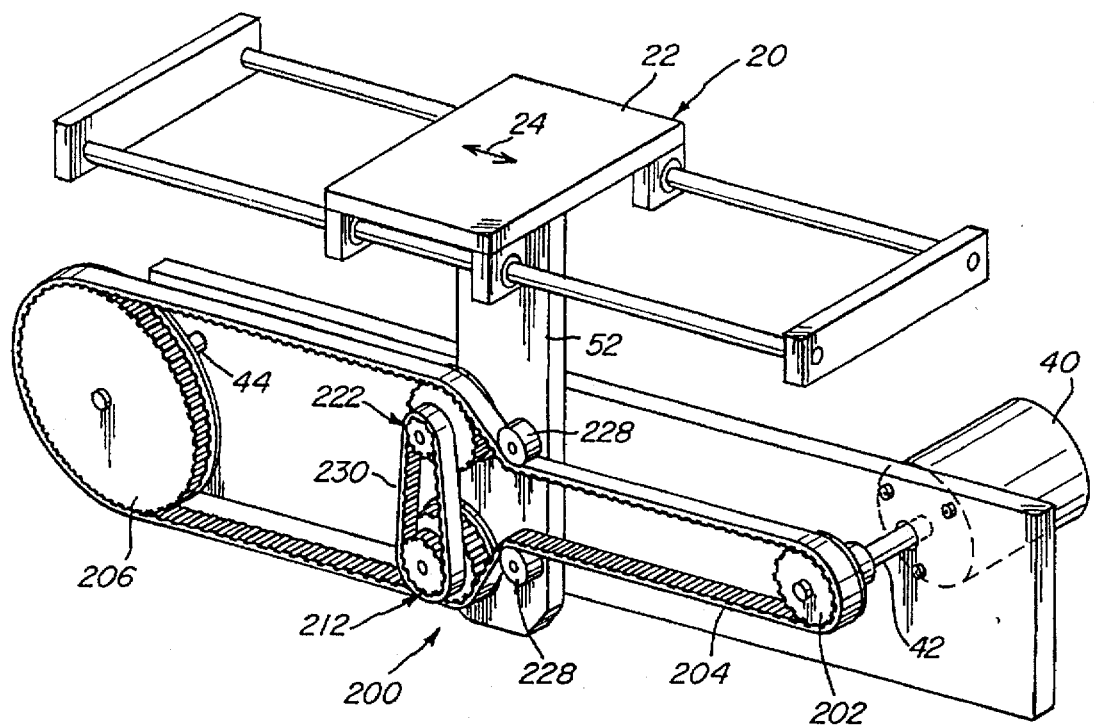
FIG. 9 is a perspective view of a fourth embodiment of a transmission according to the present invention.
Figure 10:
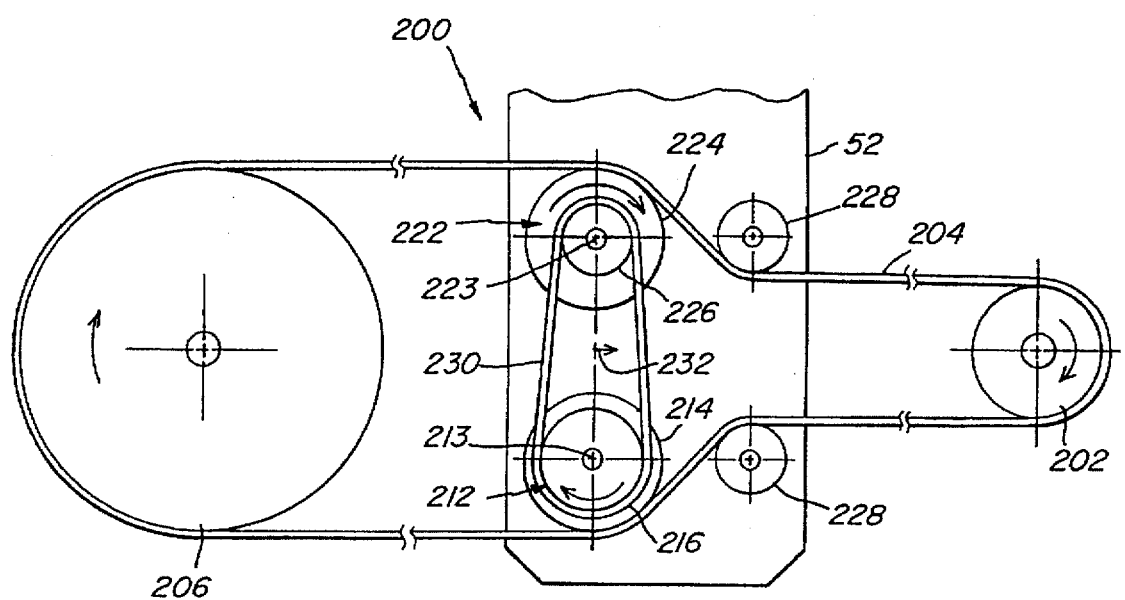
FIG. 10 is a schematic diagram of the embodiment shown in FIG. 9, which illustrates the direction of movement of the transmission; and, FIG. 11 is a schematic diagram of another aspect of the embodiment shown in FIG. 9, illustrating follower pulleys between the transmission pulleys.
Figure 11:
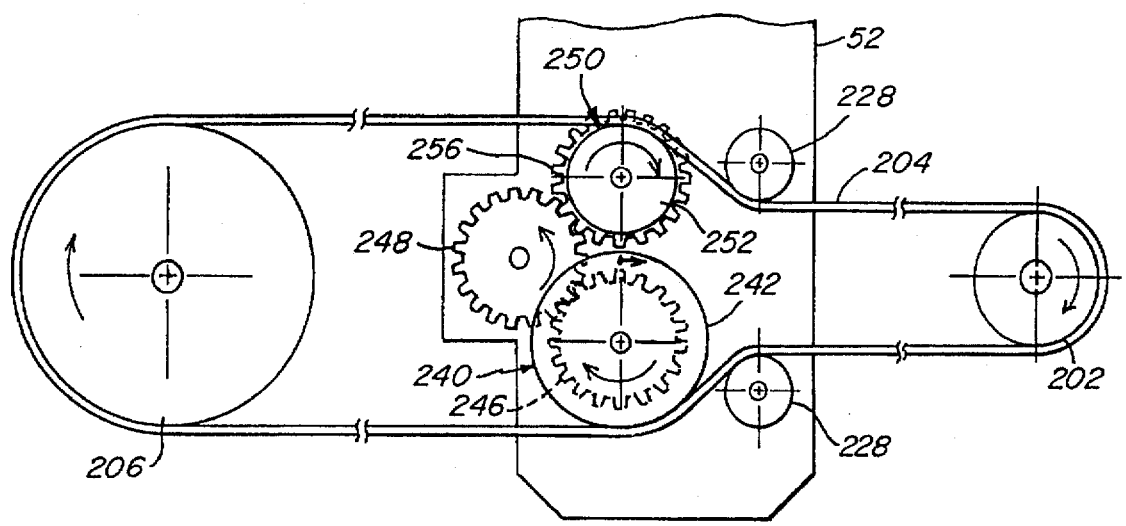

FIGS. 9, 10 and 11 show embodiments of a transmission 200, which use a single belt traveling between the drive shaft 42 and the follower shaft 44. The transmission moves the carriage 20 in the direction of movement 24. The carriage is mounted to transmission bar 52. As shown in FIG. 9, the motor 40 rotates the drive shaft 42, which has a drive pulley 202 rigidly mounted thereon. The drive pulley 202 turns a belt 204 having inwardly directed teeth. The belt 204 passes around a follower pulley 206. The follower pulley 206 is preferably larger than the drive pulley.

The transmission bar 52 is disposed between the drive shaft and the follower shaft. First and second pulley packages 212 and 222, respectively, are mounted on transmission bar 52. With particular reference to FIG. 10, the first pulley package 212 includes pulleys 214 and 216 rigidly mounted together. The pulleys 214 and 216 are mounted on the transmission bar 52 for rotation about an axis 213. The second pulley package 222 includes pulleys 224 and 226 rigidly mounted together. The pulleys 224 and 226 are mounted to the transmission bar 52 for rotation about an axis 223, which is parallel to the axis 213.

The belt 204 engages the pulleys 214 and 224 which, in this preferred embodiment, are the same diameter. A pair of idler pulleys 228, mounted on the outside of the belt, align the belt for contact with pulleys 214 and 224. Additionally, the idler pulleys increase the contact angle between the belt 204 and the pulleys 214 and 224.

The pulleys 214 and 224 are mechanically coupled by a belt 230 which connects the pulleys 216 and 226. Pulley 216 has N teeth and pulley 226 has N-x teeth, wherein N is an integer greater than 1 and x is an integer greater than 1 but less than N-1. As the drive shaft turns the belt 204 as shown in FIG. 10, each pulley package must turn at the belt velocity $V_b$ because of the engagement of pulleys 214 and 224 with the belt 204. The belt 230 between the pulleys 216 and 226 couples the motion of the pulley packages. Since the pulleys 216 and 226 have different numbers of teeth and the pulleys of each pulley package are rigidly mounted together, the pulleys 214 and 224 are constrained to rotate at different angular velocities. To meet the constraints imposed by belts 204 and 230, the transmission bar moves in the direction indicated by arrow 232. The smaller the difference in the number of teeth of the pulleys 216 and 226, the lower the pulley ratio. Thus, the pulley ratio can be controlled by selecting of the number of teeth on each of the pulleys 216 and 226.

FIG. 11 shows another embodiment of the invention. A first pulley package 240 comprises a first pulley 242 and second pulley 246. A second pulley package 250 comprises a first pulley 252 and a second pulley 256. Both pulley packages are rotatably mounted to transmission bar 52. In this embodiment, the pulleys 242 and 252, which contact the belt 204, are configured to have different sizes. This embodiment also includes an alternative mechanism to mechanically couple the rotation of the pulley packages. An idler pulley 248 is rotatably mounted on the transmission bar 52 and engages the pulleys 256 and 246. In this way, the relative angular velocities of the pulley packages can be controlled. Thus, the difference in the number of teeth on the pulleys 242 and 257 which contact the belt 204 defines the carriage velocity.

Each of the transmissions shown in FIGS. 1–11 and described above converts rotary motion of a rotary drive mechanism into linear motion of a carriage. In each embodiment, first and second pulleys are rotatably attached to the carriage. The pulleys are driven by a belt assembly which, in turn, is connected to the rotary drive mechanism. The first and second pulleys are connected by a mechanical coupling which establishes a predetermined ratio of the angular velocity of the first pulley to the angular velocity of the second pulley. In the embodiments of FIGS. 1, 2, 7 and 8, the first and second pulleys are mounted on and rigidly affixed to the same transmission shaft for rotation with respect to the carriage. Thus, the predetermined ratio of the angular velocity of the first pulley to the angular velocity of the second pulley is equal to one in these embodiments. For example, in FIGS. 1 and 2, pulleys 30 and 32 are both mounted to shaft 66 and thus rotate at the same angular velocity. In the embodiment of FIGS. 9 and 10, the pulleys 224 and 214 are mounted to different transmission shafts, but are mechanically connected by pulleys 216 and 226 and coupling belt 230. In this embodiment, the ratio of the angular velocity of pulley 214 to the angular velocity of pulley 224 is established by the relative sizes of pulleys 216 and 226. In the embodiment of FIG. 11, the predetermined ratio of the angular velocity of pulley 252 to the angular velocity of pulley 242 is established by the relative sizes of the pulleys 246, 248 and 256.

In general, the belt velocities driving the first and second pulleys may be the same or different, the sizes of the first and second pulleys may be the same or different, and the predetermined ratio of the angular velocity of the first pulley to the angular velocity of the second pulley may or may not be equal to one. The transmission structure places two mechanical constraints on the first and second pulleys: 1) the velocities of the belt or belts driving them, and 2) the mechanical coupling between the first and second pulleys which establishes the predetermined ratio of angular velocities. Except for certain sets of parameters, both constraints cannot be met when the carriage is stationary. In order to simultaneously satisfy both constraints, the carriage moves linearly with a carriage velocity that is defined by the first and second belt velocities, the first and second pulley sizes and the predetermined ratio of angular velocities.

While there have been shown and described what are considered the preferred embodiments of the present invention, it will be obvious to those skilled in the art that various changes and modifications may be made therein without departing from the scope of the invention as defined in the appended claims. For example, the motors described may be reversible to provide motion in two directions.

What is claimed is:

1. A transmission for converting rotary motion of a rotary drive mechanism to linear motion of a carriage, comprising:
   a belt assembly for connection to the rotary drive mechanism, including,
      a drive shaft for coupling to the rotary drive mechanism,
      a follower shaft spaced from said drive shaft, and
      first and second belts mounted for rotation around said drive shaft and said follower shaft;
   a first pulley driven by said first belt of said belt assembly at a first belt velocity and coupled to the carriage for rotation at a first angular velocity, said first pulley having a first pulley size;
   a second pulley driven by said second belt of said belt assembly at a second belt velocity different from said first belt velocity and coupled to the carriage for rotation at a second angular velocity, said second pulley having a second pulley size; and
   a mechanical coupling between said first and second pulleys for establishing a predetermined ratio of said first angular velocity to said second angular velocity;
   wherein the carriage, in response to rotary motion of the rotary drive mechanism, moves linearly with respect to said belt assembly at a carriage velocity determined by said first and second belt velocities, said first and second pulley sizes and the predetermined ratio of said first and second angular velocities, wherein the predetermined ratio of said first and second angular velocities is equal to one.

2. A transmission as defined in claim 1 wherein said mechanical coupling comprises a transmission shaft rotatably mounted to said carriage, said first and second pulleys being rigidly affixed to said transmission shaft.

3. A transmission as defined in claim 1 wherein said belt assembly comprises first and second drive shafts for coupling to first and second drive motors, a follower shaft spaced from said first and second drive shafts, a first belt mounted for rotation around said first shaft and said follower shaft, and a second belt mounted for rotation around said second drive shaft and said follower shaft.

4. A transmission as defined in claim 3 wherein said first and second pulleys have equal sizes and wherein said carriage velocity is established by said first belt velocity and said second belt velocity.

5. A transmission as defined in claim 4 wherein said mechanical coupling comprises a transmission shaft rotatably connected to said carriage, said first and second pulleys being rigidly affixed to said transmission shaft.

6. A transmission for converting a rotary motion of a rotary drive mechanism to linear motion of a carriage, comprising:
   a belt assembly for connection to the rotary drive mechanism, said belt assembly having a first leg and a second leg, said first leg traveling in an opposite direction from said second leg, and first and second drive shafts for rotating a first and second belt, respectively, said second drive shaft adapted for rotation independent of said first drive shaft whereby the relative rotation between the first and second drive shaft enables the transmission to move at a plurality of speeds; and, a first pulley driven by said belt assembly and having N teeth, where N is an integer greater than 1, said first pulley engaging said first leg of said belt assembly, a second pulley driven by said belt assembly and having N-x teeth, where x is an integer greater than 1 and less than N-1, said second pulley engaging said belt assembly on said second leg, said first and second pulleys being rigidly mounted together and mountable to the carriage;

whereby the rotation of the rotary drive mechanism causes the carriage to move in a linear direction in response to the rotary motion of the rotary drive mechanism at a carriage velocity determined by the number of teeth on the first and second pulleys.

* * * * *